(12) United States Patent
Goshi et al.

(10) Patent No.: US 10,378,910 B2
(45) Date of Patent: Aug. 13, 2019

(54) FACILITY OUTPUT SYSTEM, FACILITY OUTPUT METHOD, AND FACILITY OUTPUT PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Yuhei Goshi, Okazaki (JP); Kenji Nagase, Okazaki (JP); Motohiro Nakamura, Okazaki (JP); Tomoki Kodan, Nagoya (JP); Yoshitaka Kato, Anjyo (JP); Atsushi Ikeno, Kyoto (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/310,026

(22) PCT Filed: May 22, 2015

(86) PCT No.: PCT/JP2015/064740
§ 371 (c)(1),
(2) Date: Nov. 9, 2016

(87) PCT Pub. No.: WO2015/182506
PCT Pub. Date: Dec. 3, 2015

(65) Prior Publication Data
US 2017/0153112 A1 Jun. 1, 2017

(30) Foreign Application Priority Data
May 27, 2014 (JP) .................................. 2014-109232

(51) Int. Cl.
*G01C 21/34* (2006.01)
*G01C 21/36* (2006.01)
(Continued)

(52) U.S. Cl.
CPC .......... *G01C 21/343* (2013.01); *G01C 21/34* (2013.01); *G01C 21/3608* (2013.01);
(Continued)

(58) Field of Classification Search
CPC .............. G01C 21/343; G01C 21/3608; G01C 21/3629; G06F 17/30241; G06F 3/167; G10L 1/22
(Continued)

(56) References Cited

U.S. PATENT DOCUMENTS 5,931,888 A * 8/1999 Hiyokawa .............. G01C 21/34
701/411
6,446,002 B1 * 9/2002 Barton ................ G01C 21/3629
340/988
(Continued)

FOREIGN PATENT DOCUMENTS

JP 6-228088 * 9/1944 ............. G01C 21/34
JP 2000-141855 * 5/2000 ......... G01C 21/3608
(Continued)

OTHER PUBLICATIONS

Using weight-controlled token matching to extract data from HTML files; Yan Xu et al.; Proceedings of the Second International Conference on Web Information Systems Engineering; Year: 2001, vol. 1; pp. 341-349 vol. 1; IEEE Conf Publication.*
(Continued)

*Primary Examiner* — Cuong H Nguyen
(74) *Attorney, Agent, or Firm* — Oliff PLC

(57) ABSTRACT

Facility output systems, methods, and programs specify a purpose for which a user utilizes a facility, based on information input by the user and a facility type that enables the specified purpose to be achieved, based on stored purpose information. The stored purpose information includes facility type and the purpose that is achievable by using the
(Continued)

facility type. The systems, methods, and programs specify a common facility type that is common to a facility type specified for a first purpose; and one of a facility type specified for a second purpose that is different from the first purpose and a facility type specified differently from the specified facility type that enables the purpose to be achieved. The systems, methods, and programs specify the facility corresponding to the specified common facility type based on stored facility information including the specified facility type and information for specifying the facility.

18 Claims, 7 Drawing Sheets

(51) Int. Cl.
    *G06F 17/30*     (2006.01)
    *G10L 15/22*     (2006.01)
    *G06F 16/29*     (2019.01)
    *G06F 3/16*     (2006.01)
    *G06F 16/00*     (2019.01)

(52) U.S. Cl.
    CPC ..... *G01C 21/3629* (2013.01); *G01C 21/3679* (2013.01); *G06F 3/167* (2013.01); *G06F 16/00* (2019.01); *G06F 16/29* (2019.01); *G10L 15/22* (2013.01)

(58) Field of Classification Search
    USPC ........................................................ 701/427
    See application file for complete search history.

(56) References Cited

U.S. PATENT DOCUMENTS

| | | | | |
|---|---|---|---|---|
| 6,480,786 B2* | 11/2002 | Watanabe | .......... | G01C 21/3608 340/988 |
| 7,379,876 B2* | 5/2008 | Nakata | ................ | G06F 3/04812 701/36 |
| 8,271,192 B2* | 9/2012 | Jung | ................ | G01C 21/3641 340/990 |
| 8,670,936 B2* | 3/2014 | Strassenburg-Kleciak | .................. | G01C 21/36 701/533 |
| 2002/0010543 A1* | 1/2002 | Watanabe | .......... | G01C 21/3608 701/438 |
| 2002/0120455 A1* | 8/2002 | Nakata | ................ | G06F 3/04812 704/275 |
| 2006/0200284 A1* | 9/2006 | Hwang | .............. | G01C 21/3605 701/31.4 |
| 2008/0215429 A1* | 9/2008 | Ramer | .............. | G06F 17/30967 705/14.54 |
| 2010/0100318 A1* | 4/2010 | Jung | ................ | G01C 21/3629 701/431 |
| 2011/0191024 A1* | 8/2011 | DeLuca | ................ | G01C 21/28 701/472 |
| 2012/0130637 A1* | 5/2012 | Strassenburg-Kleciak | .................. | G01C 21/36 701/533 |
| 2014/0180825 A1* | 6/2014 | Ramer | .............. | G06Q 30/0267 705/14.64 |
| 2014/0257693 A1* | 9/2014 | Ehlers | ................ | G01C 21/3461 701/522 |
| 2016/0252353 A1* | 9/2016 | DeLuca | ................ | G01C 21/28 701/472 |

FOREIGN PATENT DOCUMENTS

| | | |
|---|---|---|
| JP | 2001-195424 A | 7/2001 |
| JP | 2002-303530 A | 10/2002 |
| JP | 2006-162516 A | 6/2006 |
| JP | 2007-183249 A | 7/2007 |
| JP | 2009-146299 A | 7/2009 |

OTHER PUBLICATIONS

Jun. 23, 2015 Search Report issued in International Patent Application No. PCT/JP2015/064740.

* cited by examiner

FIG. 2

[PURPOSE INFORMATION]

| PURPOSE ||GENRE|
|---|---|---|
| PURPOSE OBJECT | PURPOSE ACTION ||
| RESIDENCE CERTIFICATE | SUBMIT | CITY OFFICE |
| ^ | ^ | WARD OFFICE |
| RESIDENCE CERTIFICATE | ACQUIRE | CITY OFFICE |
| ^ | ^ | WARD OFFICE |
| ^ | ^ | CONVENIENCE STORE |
| CAR | CHARGE | CITY OFFICE |
| ^ | ^ | GAS STATION |
| ^ | ^ | CAR DEALER |
| MONEY | DEPOSIT AND WITHDRAW | CONVENIENCE STORE |
| ^ | ^ | BANK |
| ^ | ^ | POST OFFICE |
| ^ | ^ | ATM |
| MONEY | EXCHANGE | BANK |
| POSTCARD | DROP | MAILBOX |
| ^ | ^ | POST OFFICE |
| ^ | ^ | CONVENIENCE STORE |
| ⋮ | ⋮ | ⋮ |

FIG. 3

[FACILITY INFORMATION]

| FACILITY NAME | GENRE | LOCATION INFORMATION |
|---|---|---|
| A MART ○○ SHOP | CONVENIENCE STORE | (COORDINATE ETC.) |
| A MART ×× SHOP | CONVENIENCE STORE | (COORDINATE ETC.) |
| B MART ○○ SHOP | CONVENIENCE STORE | (COORDINATE ETC.) |
| ⋮ | ⋮ | ⋮ |
| C BANK ○○ BRANCH | BANK | (COORDINATE ETC.) |
| C BANK ×× BRANCH | BANK | (COORDINATE ETC.) |
| ⋮ | ⋮ | ⋮ |
| ○○ CITY OFFICE | CITY OFFICE | (COORDINATE ETC.) |
| ×× CITY OFFICE | CITY OFFICE | (COORDINATE ETC.) |
| ⋮ | ⋮ | ⋮ |

FIG. 6
[PURPOSE: WITHDRAW MONEY, DROP POSTCARD, AND ACQUIRE RESIDENCE CERTIFICATE]
(c)
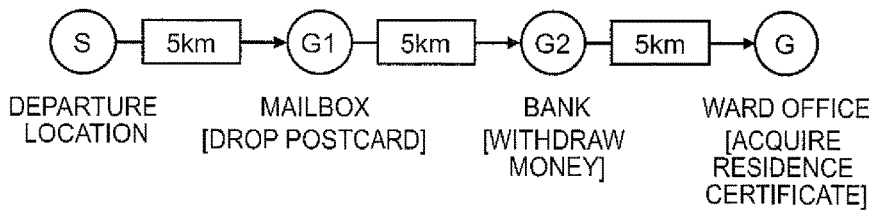
(d)
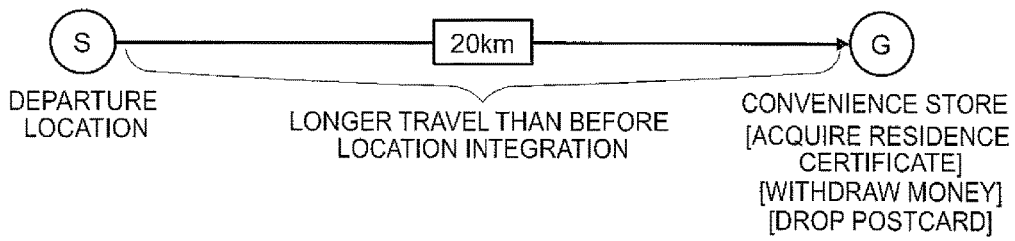
(e)
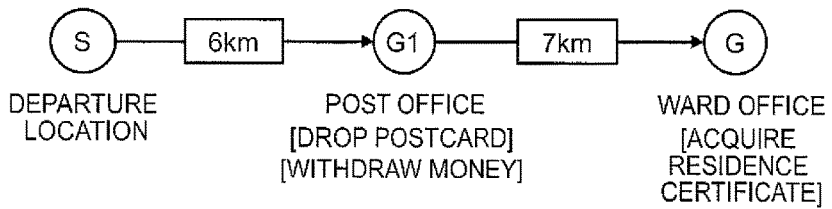
(f)
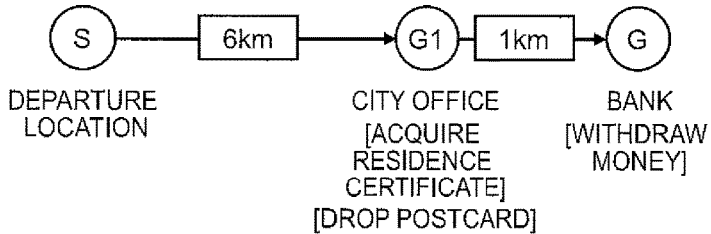

FIG. 7
[PURPOSE: CHARGE CAR, GO TO A MART ○○ SHOP, AND DROP POSTCARD]
(g)
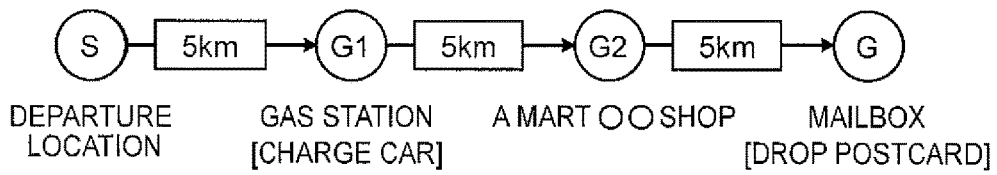
DEPARTURE     GAS STATION     A MART ○○ SHOP     MAILBOX
LOCATION      [CHARGE CAR]                       [DROP POSTCARD]
(h)
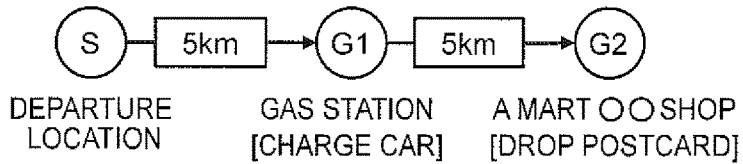
DEPARTURE     GAS STATION     A MART ○○ SHOP
LOCATION      [CHARGE CAR]    [DROP POSTCARD]

FACILITY OUTPUT SYSTEM, FACILITY OUTPUT METHOD, AND FACILITY OUTPUT PROGRAM

TECHNICAL FIELD

Related technical fields include facility output systems, a facility output methods, and a facility output programs.

BACKGROUND

There has hitherto been proposed a facility search device that searches for a complex facility in which facilities of a plurality of genres input by a user are concentrated on the basis of the plurality of genres (see Japanese Patent Application Publication No. 2009-146299 (JP 2009-146299 A), for example). With such a facility search device, a plurality of purposes can be achieved at a single complex facility, which makes it possible to reduce the trouble and time required for travel.

SUMMARY

Here, in JP 2009-146299 A mentioned above, it is necessary for the user to convert the purposes, for which the user utilizes the facilities, into the genres of facilities that enable the purposes to be achieved, on the basis of the recognition and the experience of the user himself/herself, and to input the genres which have resulted from the conversion. Thus, in the case where the user does not recognize the genres of facilities that enable the purposes to be achieved at all, or in the case where the user recognizes only some of a plurality of genres of facilities that enable such purposes to be achieved, the user may not be able to specify a complex facility that is suitable for the user to achieve the purposes.

Exemplary embodiments of the broad inventive principles described herein provide a facility output system, a facility output method, and a facility output program that can provide guidance on a facility that is suitable for a user to achieve a purpose even in the case where the user does not recognize the facility types of facilities that enable the purpose to be achieved at all or in the case where the user recognizes only some of a plurality of facility types of facilities that enable the purpose to be achieved.

Exemplary embodiments provide systems, methods, and programs that specify a purpose for which a user utilizes a facility, based on information input by the user and a facility type that enables the specified purpose to be achieved, on the basis of stored purpose information. The stored purpose information includes facility type and the purpose that is achievable by using the facility type. The systems, methods, and programs specify a common facility type that is common to a facility type specified for a first purpose; and one of a facility type specified for a second purpose that is different from the first purpose and a facility type specified differently from the specified facility type that enables the purpose to be achieved. The systems, methods, and programs specify the facility corresponding to the specified common facility type based on stored facility information including the specified facility type and information for specifying the facility.

With the facility output system, the facility output method, and the facility output program according to exemplary embodiments, a facility type that enables a purpose of a user to be achieved is specified, a common facility type is specified on the basis of the specified facility type, and a facility corresponding to the common facility type is output. Thus, a facility that is suitable for the user to achieve the purpose can be output by specifying the common facility type and outputting the facility corresponding to the common facility type even in the case where the user does not recognize the facility type that enables the purpose to be achieved or in the case where the user recognizes only some of a plurality of facility types of facilities that enable the purpose to be achieved, which makes it possible to reduce the trouble and time required for the user to achieve the purpose.

BRIEF DESCRIPTION OF THE DRAWINGS

FIG. 2 is a table indicating purpose information stored in a purpose information DB.

FIG. 3 is a table indicating facility information stored in a facility information DB.

FIG. 6 is a schematic diagram illustrating an instance c, an instance d, an instance e, and an instance f.

FIG. 7 is a schematic diagram illustrating an instance g and an instance h.

DETAILED DESCRIPTION OF EXEMPLARY EMBODIMENTS

A facility output system, a facility output method, and a facility output program according to an embodiment will be described in detail below with reference to the drawings.

[Basic Concept of Embodiment]

First, the basic concept of the embodiment will be described. The embodiment roughly relates to a facility output system, a facility output method, and a facility output program that provide a user with guidance on a facility that enables a purpose of the user to be achieved.

Here, the term "purpose" refers to a purpose, for which the user utilizes a facility, and, in the embodiment, corresponds to a concept constituted by a combination of a purpose action and a purpose object. The term "purpose action" refers to information that specifies the purpose of the user, and corresponds to a concept that indicates an action desired by the user. The term "purpose object" also refers to information that specifies the purpose of the user, and corresponds to a concept that indicates an object of the action which is indicated by the purpose action discussed above, such as an article, a location, and a person. For example, in the embodiment, the purpose "submit a residence certificate" is considered to be constituted by a combination of a purpose action "submit" and a purpose object "a residence certificate," and the purpose "exchange money" is considered to be constituted by a combination of a purpose action "exchange" and a purpose object "money." The term "facility" indicates a location and an article utilized when the user carries out a purpose, and corresponds to a concept that includes both indoor facilities and outdoor facilities.

[Specific Content of Embodiment]

Next, the specific content of the embodiment will be described.

(Configuration)

In the embodiment, a case where a facility output program is installed on an in-vehicle navigation device (hereinafter, "in-vehicle device") 1 and a center device 10 so that the in-vehicle device 1 and the center device 10 function as a facility output system 100 will be described. Besides, a facility output program may be installed on any device that includes a smartphone and a portable navigation device to constitute the facility output system 100. The function of the in-vehicle device 1 in the facility output system 100 can be implemented by components that are similar to those of an in-vehicle device known in the art, and thus will not be described. In particular, components configured to achieve the function of providing guidance on a facility will be described. Hereinafter, a particular vehicle on which the facility output system 100 is mounted (a vehicle ridden by a person that operates the in-vehicle device 1) will be referred to simply as "vehicle" as necessary. The "vehicle" includes automobiles, motorcycles, and bicycles. In the following description, however, the vehicle is an automobile.

Figure 1:
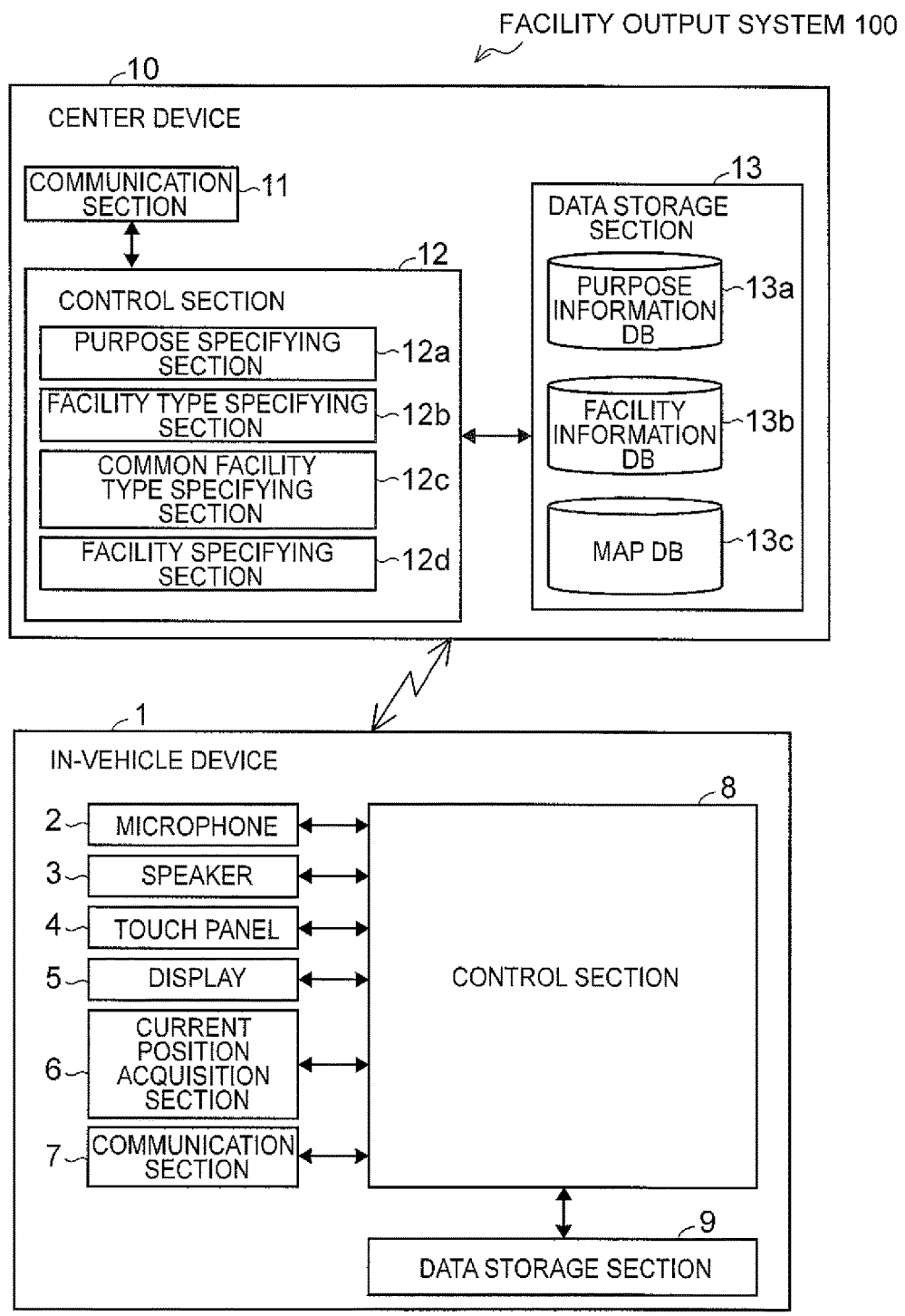
FIG. 1 is a block diagram illustrating an in-vehicle device and a center device according to an embodiment.

First, the configuration of the in-vehicle device 1 and the center device 10 which function as the facility output system 100 according to the embodiment will be described. FIG. 1 is a block diagram illustrating the in-vehicle device 1 and the center device 10 according to the embodiment.

(Configuration—In-Vehicle Device)

First of all, the configuration of the in-vehicle device 1 will be described. As illustrated in FIG. 1, the in-vehicle device 1 roughly includes a microphone 2, a speaker 3, a touch panel 4, a display 5, a current position acquisition section 6, a communication section 7, a control section 8, and a data storage section 9.

(Configuration—In-Vehicle Device—Microphone)

The microphone 2 is voice information input means for receiving voice information input by the user. A microphone known in the art can be used as the microphone 2.

(Configuration—In-Vehicle Device—Speaker)

The speaker 3 is voice output means for outputting information as a voice on the basis of control by the control section 8. In particular, the speaker 3 is output means for outputting a route found by a route search section (not illustrated) provided in the in-vehicle device 1. The specific form of the voice to be output from the speaker 3 may be determined as desired. The speaker 3 can output a synthetic voice generated as necessary and a voice recorded in advance.

(Configuration—In-Vehicle Device—Touch Panel)

The touch panel 4 is pressed by a finger or the like of the user to receive a variety of manual inputs from the user. The touch panel 4 is formed to be transparent or translucent, and provided on the front surface of the display 5 to be superimposed on the display surface of the display 5. A touch panel known in the art that includes operation position detection means of a resistive film type, a capacitance type, or the like, for example, can be used as the touch panel 4.

(Configuration—In-Vehicle Device—Display)

The display 5 is display means for displaying an image, guidance for which has been provided by the in-vehicle device 1. In particular, the display 5 is display means for displaying a map on the basis of map information stored in a map DB (not illustrated) of the data storage section 9. The specific configuration of the display 5 may be determined as desired. A flat panel display such as a liquid crystal display or an organic EL display known in the art can be used as the display 5.

(Configuration—In-Vehicle Device—Current Position Acquisition Section)

The current position acquisition section 6 is current position acquisition means for acquiring the current position of the vehicle. For example, the current position acquisition section 6 acquires the current position (coordinate), orientation, and so forth of the in-vehicle device 1, which has been detected by at least one of a GPS, a geomagnetic sensor, a distance sensor, and a gyro sensor (none of which is illustrated), by a method known in the art.

(Configuration—In-Vehicle Device—Communication Section)

The communication section 7 is communication means for communicating with the center device 10 via a network. The specific type and configuration of the communication section 7 may be determined as desired. For example, mobile wireless communication means known in the art or wireless communication means for a VICS (registered trademark) system known in the art for communication via FM multiplex broadcasting or beacons can be used as the communication section 7.

(Configuration—In-Vehicle Device—Control Section)

The control section 8 is control means for controlling the in-vehicle device 1. Specifically, the control section 8 is a computer configured to include a CPU, various types of programs interpreted and executed by the CPU (including a basic control program such as an OS and an application program run on the OS to implement a particular function), and a storage medium such as an internal memory such as a RAM configured to store the programs and various types of data. In particular, the facility output program according to the embodiment is installed on the in-vehicle device 1 via a desired storage medium or a network to substantially constitute various sections of the control section 8. (As used herein the term "storage medium" is not intended to encompass transitory signals.)

(Configuration—In-Vehicle Device—Data Storage Section)

The data storage section 9 is storage medium for storing programs and various types of data required for operation of the in-vehicle device 1. For example, the data storage section 9 is constituted using a hard disk (not illustrated) that serves as an external storage device. It should be noted, however, that any other storage media that include a magnetic storage medium such as a magnetic disk and an optical storage medium such as a DVD and a Blu-ray disc can be used in place of or together with the hard disk.

(Configuration—Center Device)

Subsequently, the configuration of the center device 10 will be described. The center device 10 is configured to roughly include a communication section 11, a control section 12, and a data storage section 13.

(Configuration—Center Device—Communication Section)

The communication section 11 is communication means for communicating with the in-vehicle device 1 via a network. The specific type and configuration of the communication section 11 may be determined as desired. For example, mobile wireless communication means known in the art or wireless communication means for a VICS (registered trademark) system known in the art for communication via FM multiplex broadcasting or beacons can be used as the communication section 11.

(Configuration—Center Device—Control Section)

The control section 12 is control means for controlling the center device 10. Specifically, the control section 12 is a computer configured to include a CPU, various types of programs interpreted and executed by the CPU (including a basic control program such as an OS and an application program run on the OS to implement a particular function), and an internal memory such as a RAM configured to store the programs and various types of data. In particular, the facility output program according to the embodiment is installed on the center device 10 via a desired storage medium or a network to substantially constitute various sections of the control section 12.

The control section 12 is configured to include, in terms of the concept of functionality, a purpose specifying section 12a, a facility type specifying section 12b, a common facility type specifying section 12c, and a facility specifying section 12d.

The purpose specifying section 12a is purpose specifying means for specifying a purpose, for which the user utilizes a facility. The facility type specifying section 12b is facility type specifying means for specifying, from predetermined facility types (hereinafter referred to as "genres"), a genre that enables the purpose, which is specified by the purpose specifying section 12a, to be achieved, on the basis of purpose information stored in a purpose information DB 13a of the data storage section 13 to be discussed later. Here, the term "genre" refers to a concept that indicates one of categories into which facilities are categorized in accordance with the function and the usage. Examples of the "genre" include "city office," "gas station," "convenience store," "bank," and "post office." The common facility type specifying section 12c is common facility type specifying means for specifying a common facility type (hereinafter referred to as "common genre") that is common to a facility type specified by the facility type specifying section 12b for a first purpose to be discussed later and one of a facility type specified by the facility type specifying section 12b for a second purpose to be discussed later that is different from the first purpose and a facility type specified or input by other means that is different from the facility type specifying section 12b. Here, the term "common genre" refers to information for specifying a facility, guidance on which is to be provided to the user. Specifically, the term corresponds to a genre that is common to a genre specified by the facility type specifying section 12b discussed above and a genre specified or input by any means. A specific method of specifying a common genre will be discussed later. The facility specifying section 12d is facility specifying means for specifying a facility corresponding to the common facility type specified by the common facility type specifying section 12c, that is, a facility corresponding to the common genre, on the basis of facility information stored in a facility information DB 13b of the data storage section 13 to be discussed later. Specific processing executed by each section of the control section 12 will be discussed later.

(Configuration—Center Device—Data Storage Section)

The data storage section 13 is storage means for storing programs and various types of data required for operation of the center device 10. For example, the data storage section 13 is constituted using a hard disk (not illustrated) that serves as an external storage device. It should be noted, however, that any other storage media that include a magnetic storage medium such as a magnetic disk and an optical storage medium such as a DVD and a Blu-ray disc can be used in place of or together with the hard disk.

Here, the data storage section 13 is configured to roughly include the purpose information database (hereinafter, the term "database" is represented as "DB") 13a, the facility information DB 13b, and a map DB 13c.

The purpose information DB 13a is purpose information storage means for storing purpose information constituted by associating genres and purposes that can be achieved by the user by utilizing facilities in the genres with each other. FIG. 2 is a table indicating the purpose information stored in the purpose information DB 13a. As indicated in FIG. 2, information corresponding to an item "purpose" and an item "genre" are stored in association with each other as the purpose information. Information to be stored in correspondence with the item "purpose" is information that specifies a purpose, and is broadly divided into an item "purpose object" and an item "purpose action." Among these, information to be stored in correspondence with the item "purpose object" is information that specifies the purpose object discussed above, and information to be stored in correspondence with the item "purpose action" is information that specifies the purpose action discussed above. One purpose is specified by a set of information stored in correspondence with the item "purpose object" and the item "purpose action." For example, when "residence certificate" is stored in correspondence with the item "purpose object" and "submit" is stored in correspondence with the item "purpose action," one purpose "submit a residence certificate" is specified. Information stored in correspondence with the item "genre" is information that specifies the genre of a facility that enables a purpose specified by the item "purpose" to be achieved. Here, at least one or more genres are stored in association with one purpose. For example, the first record from the top stores two genres, namely "city office" and "ward office" as the genre of a facility that enables the purpose "submit a residence certificate" to be achieved, and the third record from the top stores three genres, namely "city office," "gas station," and "car dealer," as the genres of facilities that enable the purpose "charge a car" to be achieved. The information which is stored in correspondence with each item may be added and deleted as appropriate.

The facility information DB 13b is facility information storage means for storing facility information constituted by associating genres and information for specifying facilities corresponding to the genres with each other. FIG. 3 is a table indicating facility information stored in the facility information DB 13b. As indicated in FIG. 3, an item "facility name," an item "genre," and an item "location information" and information corresponding to such items are stored in association with each other as the facility information. Here, information to be stored in correspondence with the item "facility name" is information that specifies the specific name of a facility. Information to be stored in correspondence with the item "genre" is information that specifies the genre of a facility. Information to be stored in correspondence with the item "location information" is information that uniquely specifies the position of a facility. Examples of such information include the GPS position coordinate or the like of a facility.

The map DB 13c is map information storage means for storing map information. Here, the term "map information" refers to information that is necessary to specify the position of various objects such as roads, road structures, and facilities. Examples of such information include node data (node number and coordinate) related to nodes set on roads, link data (link ID, link name, number of the connected node on the start point side, and number of the connected node on the end point side) related to links set on roads, road coordinate, road type (such as toll road and general road, for example), road information, feature data (such as traffic signals, road signs, guardrails, and facilities), geographic data, and so forth.

(Facility Guidance Processing)

Figure 4:
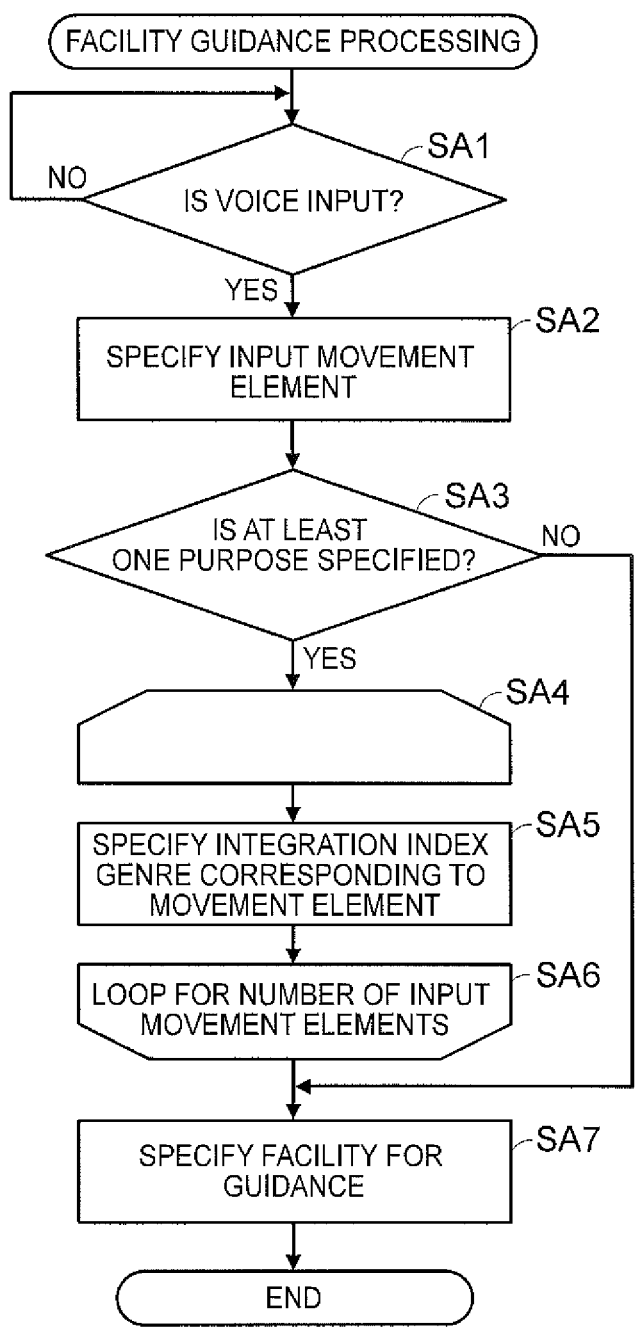
FIG. 4 is a flowchart of facility guidance processing.

Next, facility guidance processing executed by the facility output system 100 thus configured will be described. FIG. 4 is a flowchart of the facility guidance processing. The facility guidance processing is executed at a predetermined timing, and executed when the in-vehicle device 1 is turned on, for example. In the following description, the facility guidance processing will be described only schematically. Specific instances will be described in detail later.

First, the purpose specifying section 12a determines whether or not a voice is input to the microphone 2 of the in-vehicle device 1 by the user (SA1). The determination may be made in any specific method. For example, the purpose specifying section 12a may determine whether or not a voice of the user has been input via the microphone 2 during a period since the user presses a voice input icon (not illustrated) displayed on the display 5 of the in-vehicle device 1 until the voice input icon is pressed again. In the case where such a voice is input, it may be determined that a voice has been input.

Here, the specific content of the voice which is input to the microphone 2 by the user may be determined as desired. In the description of the embodiment, however, the user inputs a content that includes movement elements to the microphone 2. Here, the term "movement element" refers to information that suggests the destination of the user, and the specific content of the term may be determined as desired. In the description of the embodiment, however, the movement element may be one of the "facility name," the "genre, and the "purpose" discussed above.

Next, the purpose specifying section 12a analyzes the voice input in SA1, and specifies a movement element input by the user (SA2). For example, in the case where the purpose specifying section 12a has found through analysis that the voice input by the user in SA1 is voice information that includes a facility name which is a movement element such as "A Mart ∘∘ Shop" and "I would like to go to the A Mart ∘∘ Shop," the purpose specifying section 12a specifies that the user has input the facility name "A Mart ∘∘ Shop" as a movement element. In the case where the purpose specifying section 12a has found through analysis that the voice input by the user in SA1 is voice information that includes a genre which is a movement element such as "bank" and "I would like to go to a bank," the purpose specifying section 12a specifies that the user has input the genre "bank" as a movement element. In the case where the purpose specifying section 12a has found through analysis that the voice input by the user in SA1 is voice information that includes a purpose (a combination of a purpose object and a purpose action) which is a movement element such as "Acquire a residence certificate" and "I would like to acquire a residence certificate," the purpose specifying section 12a specifies that the user has input the purpose "acquire a residence certificate" as a movement element. In the case where the voice input by the user does not include a movement element, the purpose specifying section 12a may display an error indication to prompt the user to input a voice again.

Here, the movement element that may be input at a time by the user in SA1 is not limited to one element. For example, in the case where the user desires to handle a plurality of affairs, it is considered that a voice such as "Deposit and withdraw money, drop a postcard, and acquire a residence certificate" is input. In this case, the purpose specifying section 12a specifies that the user has input, as movement elements, three purposes "Deposit and withdraw money," "Drop a postcard," and "Acquire a residence certificate." The user may also input different types of movement elements at a time. For example, it is considered that a voice such as "Go to the A Mart ∘∘ Shop, go to a bank, and acquire a residence certificate" is input. In this case, the purpose specifying section 12a specifies that the user has input, as movement elements, a total of three movement elements, namely a facility name "A Mart ∘∘ Shop," a genre "bank," and a purpose "Acquire a residence certificate."

Next, the purpose specifying section 12a determines, on the basis of the result of specifying in the processing of SA2, whether or not at least one purpose has been specified as a movement element (SA3). In the case where it is determined that at least one purpose has been specified (SA3: Yes), the facility type specifying section 12b executes loop processing of SA4 to SA6 for each of the input movement elements until the processing is repeated a number of times corresponding to the number of the movement elements.

Specifically, the facility type specifying section 12b specifies an integrated index genre corresponding to the movement element specified in SA2 (SA5). The term "integration index genre" refers to a genre that serves as an index for determining whether or not integration of locations of facilities is to be performed. Here, the term "integration of locations" indicates combining movement elements of the same type or different types, among the movement elements of the three types, namely facility, genre, and purpose, input by the user, to reduce the number of facilities, guidance on which is to be provided to the user (hereinafter, facilities for guidance).

Here, the integration index genre may be specified in any specific method. Different means (subjects) or different methods may be used for each of the types ("facility name," "purpose," and "genre") of the movement elements input in SA2.

For example, first, in the case where "purpose" is specified as a movement element in SA2, the facility type specifying section 12b references the purpose information indicated in FIG. 2, and specifies the genres stored in the same record as the input purpose in the item "purpose" as integration index genres. For example, in the case where a purpose "charge a car" is specified as a movement element, three genres "city office," "gas station," and "car dealer" are specified as integration index genres.

In the case where "facility name" is specified as a movement element in SA2, other specifying means (not illustrated) that is different from the facility type specifying section 12b references the facility information indicated in FIG. 3, and specifies the genres stored in the same record as the input facility name in the item "facility name" as integration index genres. For example, in the case where a facility name "A Mart ∘∘ Shop" is specified as a movement element, a genre "convenience store" is specified as an integration index genre.

In the case where a "genre" is specified as a movement element in SA2, it is not necessary to newly specify an integration index genre on the basis of some information, and simply analysis content acquisition means (not illustrated), which has acquired the result of analyzing the voice input to the microphone 2, specifies the genre, which has been input to the microphone 2 as a movement element, as an integration index genre as it is. For example, in the case where a genre "bank" is specified as a movement element, the genre "bank" is specified as an integration index genre.

In the case where the processing from SA4 to SA6 has been executed for all the movement elements specified in SA2, the loop is terminated, and a facility for guidance is specified on the basis of the integration index genre specified in SA5 (SA7). The specifying may be made in any specific method. An example of such a method will be described below. First, the facility specifying section 12d determines, on the basis of the movement element specified in SA2, whether or not location integration can be made. The determination can be made specifically as follows. Roughly, it is determined whether at least one purpose (hereinafter, "first purpose") is specified as a movement element in SA2, and if there exists a common genre that is common to an integration index genre corresponding to the first purpose and an integration index genre corresponding to a second movement element specified in SA2. In the case where such a common genre exists, it is determined that location integration can be made. Here, the "second movement element" may be any of "purpose," "facility name," and "genre." An integration index genre for the second movement element may be specified by any subject and in any method. In the embodiment, however, an integration index genre for the second movement element is specified by the subject and in the method described for each of the types of the movement elements in the description of the processing of SA5 discussed above. That is, in the case where the "second movement element" is a "purpose," an integration index genre for the purpose (second purpose) is specified by the facility type specifying section 12b as the subject and in the method which includes referencing the purpose information stored in the purpose information DB 13a. In the case where the "second movement element" is "facility name," meanwhile, an integration index genre for the facility name is specified by other specifying means which is different form the facility type specifying section 12b discussed above as the subject and in the method which includes referencing the facility information stored in the facility information DB 13b. In the case where the "second movement element" is a "genre," an integration index genre for the genre is specified by the analysis content acquisition means discussed above as the subject and in the method in which the genre input to the microphone 2 is used as it is.

Here, location integration can be made only in the case where at least one purpose has been specified as a movement element, because of the conception that it is desirable to integrate the location for a movement element input as "purpose" by the user with the location for a second movement element, but that it is not desirable to integrate the location for a movement element input as "facility name" or "genre," other than "purpose," with the location for a second movement element. That is, in the case where the user inputs a purpose such as "I would like to charge a car," for example, it is considered that the user has made the input while considering that "any facility at which a car can be charged will do." Thus, it is possible to reduce the number of facilities, guidance on which is to be provided, by integrating the location for a movement element input as "purpose" with the location for a second movement element. Meanwhile, in the case where the user inputs a facility name such as "I would like to go to the A Mart ∘∘ Shop," for example, it is considered that the user has made the input while considering that the user "would definitely like to go to the A Mart ∘∘ Shop," and it is considered that he/she has no intention of going to another convenience store, for example. Thus, it does not match the intention of the user to provide guidance on a route that does not pass by the A Mart ∘∘ Shop by integrating the location for the movement element input as the facility name with the location for a second movement element. This also applies to a case where a "genre" is input as a movement element. As described above, it is determined that location integration can be made only in the case where at least one purpose is specified as a movement element in order to integrate only the location for a movement element input as "purpose" with the location for a second movement element in consideration of the intention of the user.

In the case where it is determined that location integration can be made, the facility specifying section 12d decides what specific pattern of combinations is used to make location integration for the movement elements. The determination may be made using any criterion. For example, movement elements to be subjected to location integration may be decided on the basis of the distance of a route that passes by all the facilities for guidance or the time required for the route, for example. Specifically, the time required for a route before location integration is made and the time required for a route after location integration is made may be calculated, a comparison is made between the calculated required times, and movement elements to be subjected to location integration may be decided such that the required time after location integration is made is shorter than the required time before location integration is made.

In the case where a plurality of movement elements are input and there exist a plurality of patterns of combinations of movement elements to be subjected to location integration, location integration is made in accordance with a pattern, among such patterns, that minimizes the time required for a route. In the case where there exist a plurality of patterns with about the same time required for a route, location integration is made in accordance with a pattern that minimizes the number of facilities for guidance. This is because it is considered that the actual required time is shorter as the number of facilities for guidance is smaller in consideration of the parking time at each facility for guidance etc.

In the case where at least one purpose has not been specified as a movement element (SA3: No) (i.e. in the case where only a facility name, only a genre, or a facility name and a genre are specified as movement elements), it is determined that it is not necessary to make location integration, and a facility for guidance is specified without executing the processing from SA4 to SA6 (i.e. not on the basis of the integration index genre specified in SA5) (SA7). The facility for guidance and the route for guidance specified in this way are output from the speaker 3, or displayed on the display 5, to be provided to the user. The facility guidance processing is thus terminated.

(Specific Instance)

Figure 5:
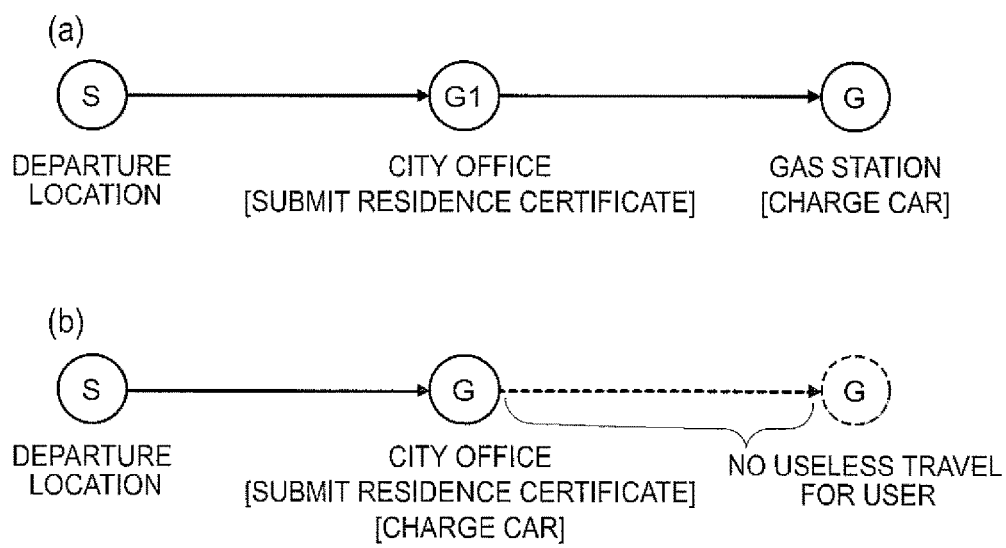
FIG. 5 is a schematic diagram illustrating an instance a and an instance b.

Subsequently, the processing which is executed by the facility output system 100 according to the embodiment will be described in detail with reference to FIG. 4 while referring to some specific instances. FIG. 5 is a schematic diagram illustrating an instance a and an instance b. FIG. 6 is a schematic diagram illustrating an instance c, an instance d, an instance e, and an instance f. FIG. 7 is a schematic diagram illustrating an instance g and an instance h. FIGS. 5 to 7 illustrate, in a simplified manner, a route (hereinafter "route for guidance"), guidance on which is provided to the user by the in-vehicle device 1, on the basis of the facilities for guidance specified in the processing of SA7 in the facility guidance processing illustrated in FIG. 4. In each of the drawings, the departure location is indicated by "S," the final destination location is indicated by "G" and locations visited on the way from the departure location to the destination location are indicated by "G1" and "G2." The distance between the locations is indicated in the drawings as necessary. The final destination location and the visited locations correspond to the "facilities for guidance" discussed above.

(Specific Instance—Instance a and Instance b)

First, the instance a and the instance b which are illustrated in FIG. 5 will be described. In both the instance a and the instance b, the purpose of the user is "I would like to submit a residence certificate and charge a car." In the instance a, guidance on a facility is provided in accordance with the related art. In the instance b, guidance on a facility is provided by the facility output system 100 according to the embodiment.

First, the facility guidance processing according to each instance illustrated in FIG. 5 will be described schematically. First, in the related art, the user replaces the purpose "submit a residence certificate" with the genre "city office" on the basis of his/her knowledge and experience, replaces the purpose "charge a car" with the genre "gas station" on the basis of his/her knowledge and experience, and thereafter inputs a voice "I would like to go to a city office, and go to a gas station" to the microphone 2. The in-vehicle device, which has received the input, searches for a route for guidance that passes by two facilities, namely a city office and a gas station, and provides guidance on the route to the user as in the instance a. Thus, it is necessary for the user to sequentially go to the two facilities, namely a city office and a gas station, in order to achieve his/her own purpose. In reality, however, it is not necessary for the user to go to a gas station in the case where a car can also be charged at a city office, and the route for guidance causes useless travel to the user. Thus, in the facility guidance processing discussed above, a facility for guidance is specified after making location integration as in the instance b in order to reduce the possibility that useless travel is caused to the user due to the lack of recognition of the user.

Next, a specific method of specifying a facility for guidance as in the instance b will be described while referring to the flowchart of FIG. 4 as appropriate. First, in the case where the user inputs a voice "I would like to submit a residence certificate and charge a car" (SA1: Yes), the purpose specifying section 12a specifies a purpose "submit a residence certificate" and a purpose "charge a car" as movement elements (SA2). The purpose specifying section 12a determines that at least one purpose (in the instance, two purposes) has been specified as a movement element (SA3: Yes), and specifies an integration index genre corresponding to each purpose with reference to the purpose information indicated in FIG. 2 (SA5). Specifically, the integration index genre for the purpose "submit a residence certificate" is specified as "city office" and "ward office," and the integration index genre for the purpose "charge a car" is specified as "city office," "gas station," and "car dealer." A facility for guidance is specified on the basis of the integration index genres (SA7).

The specifying may be made in any specific method. An example of such a method will be described below. First, the common facility type specifying section 12c determines whether or not there exists a common genre that is common to the integration index genre specified for the first purpose "submit a residence certificate" and the integration index genre specified for the second purpose "charge a car." In other words, it is determined whether there exists a genre of a facility at which both the purpose "submit a residence certificate" and the purpose "charge a car" can be achieved. In the instance, the integration index genre "city office" is common to the two purposes, and therefore the common genre is specified as the city office.

Next, the facility specifying section 12d specifies a facility for guidance on the basis of the common genre thus specified. The specifying may be made in any method. For example, the facility specifying section 12d first references information stored in correspondence with the item "genre," in the facility information stored in the facility information DB 13b, to specify all the facilities (e.g. the city office of ∘∘ city, the city office of ×× city, . . . ) corresponding to the common genre (i.e. city office). It is not always necessary to specify all the facilities included in the facility information. For example, only facilities that exist within a predetermined distance (e.g. 10 km) from the departure location may be specified. The city office (e.g. the city office of ∘∘ city) positioned closest to the departure location is specified with reference to the item "location information" associated with the facilities specified in this way, and the specified city office is specified as a facility for guidance.

In this way, it is possible to specify, from a plurality of purposes input by the user, a genre of a facility at which the purposes can be achieved, on the basis of the purpose information stored in the purpose information DB 13a. Therefore, it is possible to specify a facility that is suitable for the user to achieve his/her purposes beyond the recognition of the user. Guidance according to the present application is particularly effective in the case where the user does not recognize at all that the purpose "charge a car" can be achieved at a city office and in the case where the user does not recognize any facility at which the purpose "charge a car" can be achieved, for example.

(Specific Instance—Instance c, Instance d, Instance e, and Instance f)

Next, an instance c, an instance d, an instance e, and an instance f illustrated in FIG. 6 will be described. In all the instance c, the instance d, the instance e, and the instance f, the purpose of the user is "withdraw money, drop a postcard, and acquire a residence certificate." In the instance c, guidance on a facility is provided in accordance with the related art. In the instance d, the instance e, and the instance f, guidance on a facility is provided by the facility output system 100 according to the embodiment.

First, the facility guidance processing according to each instance illustrated in FIG. 6 will be described schematically. First, in the related art, the user replaces, within his/her brain, the purpose "withdraw money" with the genre "bank" on the basis of his/her knowledge, replaces, within his/her brain, the purpose "drop a postcard" with the genre "mailbox" on the basis of his/her knowledge, replaces, within his/her brain, the purpose "acquire a residence certificate" with the genre "ward office" on the basis of his/her knowledge, and thereafter inputs a voice "I would like to go to a bank, go to a mailbox, and go to a ward office" to the microphone 2. The in-vehicle device, which has received the input, searches for a route for guidance that passes by three facilities, namely a bank, a mailbox, and a ward office, and provides guidance on the route to the user as in the instance a. Meanwhile, with the facility output system 100 according to the embodiment, as discussed above, it is possible to provide guidance on a convenience store, at which all the three purposes can be achieved, as indicated in the instance d. This eliminates the need for the user to go to three facilities, but it is only necessary to go to one facility, which makes it possible to reduce useless travel by the user. However, providing guidance on one facility in this way is not always desirable. For example, as indicated by the comparison between the instance c and the instance d, it is conceivable that the travel distance and the required time for a case where guidance on only one facility is provided are longer than those for a case where guidance on three facilities is provided, and therefore it is not preferable to provide guidance on the one facility. Thus, in order to avoid such a situation, it is desirable to specify a facility for guidance in consideration of the time required for a route for guidance.

Subsequently, a specific method of specifying a facility for guidance with the travel distance along a route for guidance taken into consideration in this way will be described while referring to the flowchart of FIG. 4 as appropriate. Description that is the same as the description which has been made above in relation to the instance a and the instance b is omitted as appropriate. First, in the case where the user inputs a voice "withdraw money, drop a postcard, and submit a residence certificate" (SA1: Yes), the purpose specifying section 12a specifies, as movement elements, a purpose "withdraw money," a purpose "drop a postcard," and a purpose "submit a residence certificate" (SA2). The purpose specifying section 12a determines that at least one purpose (in the instance, three purposes) has been specified as a movement element (SA3: Yes), and specifies an integration index genre corresponding to each purpose with reference to the purpose information indicated in FIG. 2 (SA5). Specifically, the integration index genre for the purpose "withdraw money" is specified as "convenience store," "bank," "post office," and "ATM," the integration index genre for the purpose "drop a postcard" is specified as "mailbox," "post office," and "convenience store," and the integration index genre for the purpose "acquire a residence certificate" is specified as "city office," "ward office," and "convenience store." A facility for guidance is specified on the basis of the integration index genres (SA7).

The specifying may be made in any method. In the following description, however, a comparison is made between the time required for a route for guidance (hereinafter, "first route") for a case where facilities for guidance are specified such that the plurality of purposes can be achieved at different facilities respectively and the time required for a route for guidance (hereinafter, "second route") that passes through at least a facility corresponding to the common genre.

Specifically, first, the facility specifying section 12d specifies a first route that enables the purposes to be achieved at different facilities respectively in a method that is similar to that according to the related art. For example, it is assumed that a first route that allows the purpose "drop a postcard" to be achieved at a mailbox, allows the purpose "withdraw money" to be achieved at a bank, and allows the purpose "acquire a residence certificate" to be achieved at a ward office as in the route indicated in the instance c is specified in a method known in the art. Subsequently, the facility specifying section 12d calculates the time required for the first route on the basis of information on the time required for each link and each node stored in the map DB 13c etc.

Next, the facility specifying section 12d specifies a common genre such that the number of facilities for guidance is minimized, and specifies a second route from the departure location to a facility corresponding to the common genre. For example, it is assumed that the common genre is specified as "convenience store" which reduces the number of facilities for guidance to one (only convenience store), and specifies a second route that allows all the purposes, namely "drop a postcard," "withdraw money," and "acquire a residence certificate," to be achieved at a convenience store as in the route indicated in the instance d. Subsequently, the facility specifying section 12d calculates the time required for the second route on the basis of information on the time required for each link and each node stored in the map DB 13c etc. In the instance, "convenience store" is the only common genre that reduces the number of facilities for guidance to one. In the case where there exist other such common genres, however, a second route that passes by a facility corresponding to the common genres is specified, and the time required for the second route is specified similarly.

The facility specifying section 12d makes a comparison between the time required for the first route and the time required for the second route which have been calculated as described above. In the case where the time required for the second route is shorter, it is determined that the required time can be reduced by making location integration, and the second route is specified as a candidate for the route for guidance. In the case where the time required for the second route is longer, on the other hand, it is determined that the required time is increased by making location integration, and the second route is not specified as a candidate for the route for guidance. Such a comparison between the required times is executed for each second route specified as described above. For example, the total distance of the route for guidance (second route) in the instance d is 20 km, and the total distance of the route for guidance (first route) in the instance c is 15 km. It can be determined that the time required for the second route is longer, and therefore the second route is not specified as a candidate for the route for guidance.

After a candidate for the route for guidance is specified in the case where a common genre is specified such that the number of facilities for guidance is minimized in this way, a common genre is specified such that the number of facilities for guidance is the minimum number plus one, and a candidate for a second route from the departure location to a facility corresponding to the common genre is specified. Examples of the common genre which results in the number of facilities for guidance being the minimum number plus one in this way include "post office" which results in the number of facilities for guidance being two (post office and ward office) as indicated in the instance e and "city office" which results in the number of facilities for guidance being two (city office and bank) as indicated in the instance f.

Similarly, a comparison is made between the time required for the first route and the time required for the second route, and it is specified whether each second route specified as described above can be a candidate for the route for guidance. For example, the total distance of the route for guidance (second route) in the instance e is 13 km, and the total distance of the route for guidance (first route) in the instance c is 15 km. It can be determined that the time required for the second route is shorter, and therefore the second route is specified as a candidate for the route for guidance. In addition, the total distance of the route for guidance (second route) in the instance f is 7 km, and the total distance of the route for guidance (first route) in the instance c is 15 km. It can be determined that the time required for the second route is shorter, and therefore the second route is specified as a candidate for the route for guidance. Afterward, similarly, common genres are specified such that the number of facilities for guidance is the minimum number plus two, the minimum number plus three, . . . , to extract candidates for facilities for guidance. Lastly, among the candidates for the route for guidance extracted in this way, the route with the minimum total distance is specified as the route for guidance. In this way, a situation in which the required time is increased by making location integration can be prevented, which enables the user to achieve the purposes in a shorter required time.

In the instances described above, candidates for facilities for guidance with the shortest required time are specified as facilities for guidance. However, a route with the minimum number of facilities for guidance may be specified as the route for guidance, for example.

(Specific Instance—Instance g and Instance h)

Next, the instance g and the instance h which are illustrated in FIG. 7 will be described. In both the instance g and the instance h, the purpose of the user is "charge a car, go to the A Mart ∘∘ Shop, and drop a postcard." In the instance g, guidance on a facility is provided in accordance with the related art. In the instance h, guidance on a facility is provided by the facility output system 100 according to the embodiment.

First, the facility guidance processing according to each instance illustrated in FIG. 7 will be described schematically. First, in the related art, the user replaces, within his/her brain, the purpose "charge a car" with the genre "gas station" on the basis of his/her knowledge, replaces, within his/her brain, the purpose "drop a postcard" with the genre "mailbox" on the basis of his/her knowledge, and thereafter inputs a voice "I would like to go to a gas station, go to the A Mart ∘∘ Shop, and go to a mailbox" to the microphone 2. The in-vehicle device, which has received the input, searches for a route for guidance that passes by three facilities, namely a gas station, the A Mart ∘∘ Shop, and a mailbox, and provides guidance on the route to the user as in the instance g. With the facility output system 100 according to the embodiment, meanwhile, as indicated in the instance h, the purpose "drop a postcard" can be achieved at the A Mart ∘∘ Shop, which makes it possible to reduce the trouble of going to a mailbox.

Next, a specific method of specifying a facility for guidance as in the instance h will be described while referring to the flowchart of FIG. 4 as appropriate. Description that is the same as the description which has been made above in relation to the instance a to the instance f is omitted as appropriate. Here, as indicated in each of the instances discussed above, in the case where "purpose" is input as a movement element, the user is provided with guidance on a facility of any genre as long as the purpose can be achieved at the facility. In the case where "facility name" is input as a movement element as in the present instance, however, a facility for guidance is specified such that the facility corresponding to the facility name is definitely passed by in order to provide guidance that matches the intention of the user as discussed above. For example, as in the instance h, in the case where the user inputs a voice "I would like to go to a gas station, go to the A Mart ∘∘ Shop, and go to a mailbox," a facility for guidance is specified such that "A Mart ∘∘ Shop," which is input as "facility name," is definitely passed by. In this respect, in the case where "genre" is input as a movement element, similarly, a facility for guidance is specified such that a facility corresponding to the input genre is definitely passed by.

Specifically, first, in the case where the user inputs a voice "charge a car, go to the A Mart ∘∘ Shop, and drop a postcard" (SA1: Yes), the purpose specifying section 12a specifies, as movement elements, a purpose "charge a car," a facility name "A Mart ∘∘ Shop," and a purpose "drop a postcard" (SA2). The purpose specifying section 12a determines that at least one purpose (in the instance, two purposes) has been specified as a movement element (SA3: Yes), and specifies an integration index genre corresponding to each movement element with reference to the purpose information indicated in FIG. 2 and the facility information indicated in FIG. 3 (SA5). Specifically, the integration index genre for the purpose "charge a car" is specified as "city office," "gas station" and "car dealer," and the integration index genre for the purpose "drop a postcard" is specified as "mailbox," "post office," and "convenience store" with reference to the purpose information. In addition, the integration index genre for "A Mart ∘∘ Shop" is specified as "convenience store" with reference to the facility information. A facility for guidance is specified on the basis of the integration index genres (SA7).

The specifying may be made in any specific method. An example of such a method will be described below. First, the common facility type specifying section 12c determines whether the movement element input as "purpose" can be subjected to location integration with "A Mart ∘∘ Shop." Specifically, the common facility type specifying section 12c determines whether an integration index genre that is common to "convenience store," which is the integration index genre of the A Mart ∘∘ Shop, is included in the integration index genres for the movement elements "charge a car" and "drop a postcard" which are input as "purpose." For example, in the instance, the integration index genre for the purpose "drop a postcard" includes the genre "convenience store," and therefore it is determined that the movement element "drop a postcard" can be subjected to location integration with the "A Mart ∘∘ Shop." In addition, the integration index genre for the purpose "charge a car" does not include the genre "convenience store," and therefore it is determined that the movement element "charge a car" cannot be subjected to location integration with the "A Mart ∘∘ Shop."

Based on the above, the facility specifying section 12d specifies a route for guidance that does not pass by a facility at which the purpose "drop a postcard" can be achieved (since such a movement element can be subjected to location integration with the A Mart ∘∘ Shop) but passes by a facility at which the purpose "charge a car" can be achieved and the A Mart ∘∘ Shop as facilities for guidance such that the distance of the route for guidance is minimized. In this way, in the case where "facility name" is input as a movement element, any specifying means specifies a genre corresponding to the input facility name with reference to the facility information, and determines whether there is any purpose that can be subjected to location integration with a facility indicated by the facility name using the specified genre as the criterion. Thus, a route for guidance can be specified such that the A Mart ∘∘ Shop, which is a facility corresponding to the facility name, is definitely passed by.

In the above description, "facility name" is input as a movement element. However, similar processing can be executed for "genre." That is, in the case where "genre" is input as a movement element, it is determined whether there is any purpose that can be subjected to location integration with a facility indicated by a genre input by any input means (e.g. the microphone 2) using the input genre as the criterion. Thus, a route for guidance can be specified such that a facility corresponding to the facility name is definitely passed by. In addition, in the case where a plurality of "facility names" or "genres" are input, similarly, the presence or absence of a facility that can be subjected to location integration can be determined using the input facility names or genres as the criteria, which makes it possible to specify facilities for guidance such that facilities corresponding to the facility names or facilities corresponding to the genres are definitely passed by. As indicated in SA3 of the facility guidance processing illustrated in FIG. 3, in the case where "purpose" is not input as a movement element (that is, in the case where a plurality of "facility names" are input as movement elements, in the case where "facility name" and "genre" are input, or in the case where a plurality of "genres" are input), it is necessary that facilities corresponding to the facility names or genres should be passed by, and therefore location integration is not made. Description of the instances is now finished.

[Modifications to Embodiment]

While an embodiment has been described above, the specific configuration and means may be altered and improved as desired within the scope of the technical concept of the inventive principles. Such modifications will be described below.

The problem to be solved and the effects are not limited to those discussed above, and may differ in accordance with implementation and configuration. Thus, only part of the problem discussed above may be solved, and only some of the effects discussed above may be achieved. For example, in the case where the trouble required for travel by the user can only be reduced to the same degree as in the related art and guidance on a facility can be provided by a technique that is different from the related art, the problem to be solved has been solved.

(Distribution and Integration)

Each of the electrical constituent elements discussed above is configured in terms of the concept of functionality, and it is not always necessary that each of the electrical constituent elements should be configured physically as illustrated in the drawings. That is, the specific form of distribution and integration of the various sections is not limited to that illustrated in the drawings, and all or some of the sections can be configured in a distributed or integrated manner functionally or physically in a desired unit in accordance with various types of loads and the status of use. For example, the constituent elements of the facility output system 100 may be distributed to a plurality of devices, and the facility output system 100 may be integrated with another device. For example, the in-vehicle device 1 may not be provided, and the center device 10 may be provided with all the constituent elements of the in-vehicle device 1 so that the center device 10 alone executes the facility guidance processing discussed above. In the case where the constituent elements are distributed, in addition, the constituent elements may be mutually coordinated with each other either via a wire or wirelessly, or both via a wire and wirelessly.

(Shapes, Numerical Values, Structures, and Time Series)

The shapes and the numerical values of constituent elements given as examples in the embodiment and the drawings, and the structures and the mutual relationship, in time series, among a plurality of the constituent elements, can be altered and improved as desired within the scope of the technical concept.

(Purpose Specifying Section)

In the embodiment, the purpose specifying section 12*a* specifies a purpose of the user on the basis of voice information input via the microphone 2 by the user. However, a purpose of the user may be specified on the basis of information (e.g. character information) input via the touch panel 4 by the user.

(Purpose Information)

The content of the purpose information is not limited to the content described in the embodiment, and a purpose object and a purpose action may not be separated from each other. For example, information such as "submit a residence certificate" and "charge a car" may be stored in correspondence with the item "purpose." In addition, there may exist some records that store only one of a purpose object and a purpose action. For example, the item "purpose object" may be left blank, and information "remittance" may be stored as information corresponding to the item "purpose action." This is because just the word "remittance" makes it possible to easily recognize that the corresponding purpose object is "money."

[Some of Characteristics and Effects of Embodiment]

Lastly, some of characteristics and effects of the embodiment which have been described so far will be described below as examples. It should be noted, however, that the characteristics and the effects of the embodiment are not limited to those described below, and only some of the characteristics described below may be provided to achieve only some of the effects described below, or a characteristic other than the characteristics described below may be provided to achieve an effect other than the effects described below.

A facility output system according to an aspect 1 of the embodiment includes: purpose information storage means for storing purpose information constituted by associating a facility type and a purpose that is achievable by a user by utilizing a facility in the facility type with each other; facility information storage means for storing facility information constituted by associating the facility type and information for specifying the facility corresponding to the facility type with each other; purpose specifying means for specifying a purpose, for which the user utilizes the facility, on the basis of information input by the user; facility type specifying means for specifying, in the case where the purpose is specified by the purpose specifying means, the facility type that enables the purpose to be achieved, on the basis of the purpose information stored in the purpose information storage means; common facility type specifying means for specifying a common facility type that is common to a facility type specified for a first purpose by the facility type specifying means, and one of a facility type specified for a second purpose by the facility type specifying means, the second purpose being different from the first purpose, and a facility type specified or input by other means that is different from the facility type specifying means; facility specifying means for specifying the facility corresponding to the common facility type specified by the common facility type specifying means on the basis of the facility information stored in the facility information storage means; and output means for outputting the facility specified by the facility specifying means.

With the facility output system according to the aspect 1, a facility type that enables a purpose of a user to be achieved is specified, a common facility type is specified on the basis of the specified facility type, and a facility corresponding to the common facility type is output. Thus, a facility that is suitable for the user to achieve the purpose can be output by specifying the common facility type and outputting the facility corresponding to the common facility type even in the case where the user does not recognize the facility type that enables the purpose to be achieved or in the case where the user recognizes only some of a plurality of facility types of facilities that enable the purpose to be achieved, which makes it possible to reduce the trouble and time required for the user to achieve the purpose.

A facility output system according to another aspect 2 of the embodiment is the facility output system according to the aspect 1, in which the common facility type specifying means specifies the common facility type and the facility specifying means specifies the facility such that a number of facilities to be output from the output means is minimized.

With the facility output system according to the aspect 2, the common facility type specifying means specifies the common facility type and the facility specifying means specifies the facility such that the number of facilities, guidance on which is to be provided, is minimized. Thus, the user can achieve the purpose at a minimum number of facilities, which makes it possible to reduce the trouble and time required for travel by the user.

A facility output system according to another aspect 3 of the embodiment is the facility output system according to the aspect 1 or 2, in which: in the case where a plurality of purposes are specified by the purpose specifying means and the facility type is specified for each of the plurality of purposes by the facility type specifying means, the common facility type specifying means specifies the common facility type, which is common to at least two of the plurality of purposes, on the basis of the purpose information stored in the purpose information storage means; the facility specifying means selects a plurality of facilities such that the plurality of purposes are achievable at different facilities respectively and calculates a time required for a first route and a time required for a second route on the basis of the information stored in the purpose information storage means and the information stored in the facility information storage means, the first route starting at a departure location of a vehicle and passing through all of the selected facilities, and the second route enabling the plurality of purposes to be achieved at one or more facilities and being different from the first route, and the second route starting at the departure location of the vehicle and passing through at least the facility corresponding to the common facility type; and the common facility type specifying means specifies the common facility type and the facility specifying means specifies the facility such that the time required for the second route is shorter than the time required for the first route.

With the facility output system according to the aspect 3, the common facility type specifying means specifies the common facility type and the facility specifying means specifies the facility such that the time required for the second route is shorter than the time required for the first route. Thus, an appropriate facility can be output with the time required for a route for achieving the purpose taken into consideration, which makes it possible to further reduce the time required for the user to achieve the purpose.

A facility output system according to another aspect 4 of the embodiment is the facility output system according to any one of the aspect 1 to the aspect 3, in which: the purpose information storage means stores, as the purpose, a purpose object and a purpose action in association with each other; the purpose specifying means specifies the purpose object and the purpose action from the information input by the user; and the facility type specifying means specifies the facility type that enables the purpose to be achieved, by specifying the facility type corresponding to the purpose object and the purpose action specified by the purpose specifying means.

With the facility output system according to the aspect 4, a purpose object and a purpose action are specified from information input by the user, and a purpose of the user is specified on the basis of the purpose object and the purpose action. Thus, the user can input a purpose significantly easily, which makes it possible to improve the operability for the user.

A facility output system according to another aspect 5 of the embodiment is the facility output system according to any one of the aspect 1 to the aspect 4, further including voice information input means for receiving an input of voice information by the user, in which the purpose specifying means specifies the purpose, for which the user utilizes the facility, on the basis of the voice information received by the voice information input means.

With the facility output system according to the aspect 5, a purpose, for which the user utilizes a facility, is specified on the basis of voice information input by the user. Thus, the user can input a purpose, for which he/she uses a facility, in a significantly easy method, which improves the operability for the user.

The invention claimed is:

1. A facility output system comprising:
   a memory that stores:
      purpose information constituted by associating one or more facility types with each of a plurality of purposes that are achievable at the facility type; and
      facility information constituted by associating each facility type with a plurality of corresponding facilities; and
   a processor programmed to:
      receive first information input by a user specifying a purpose for which the user intends to utilize the facility to be output;
      specify a first facility type that enables the specified purpose to be achieved based on the stored purpose information;
      specify a second facility type, that is different form the first facility type based on second information input by the user;
      perform location integration by:
         determining whether the specified purpose can be achieved at the specified second facility type based on the stored purpose information;
         if the specified purpose can be achieved at the second facility type, designating the second facility type as a common facility type; and
         specifying a facility corresponding to the specified common facility type on the basis of the stored facility information; and
      output the specified facility as a target for vehicle navigation.

2. The facility output system according to claim 1, wherein the processor is programmed to:
   designate the common facility type and specify the facility such that a number of facilities to be output is minimized.

3. The facility output system according to claim 1, wherein the processor is programmed to:
   determine a first navigation route starting at a departure location and including a facility corresponding to the first facility type and a facility corresponding to the second facility type based on the facility information;
   determine a second navigation route starting at the departure location and including a facility corresponding to the specified common facility type;
   calculate a time required for the first navigation route and a time required for the second navigation route; and
   specify the common facility type and specify the facility such that the time required for the second route is shorter than the time required for the first route.

4. The facility output system according to claim 1, wherein:
   the memory stores, as the purpose, a purpose object and a purpose action in association with each other; and
   the processor is programmed to:
      specify the purpose object and the purpose action from the first information input by the user; and
      specify the first facility type that enables the specified purpose to be achieved, by specifying the first facility type corresponding to the specified purpose object and the specified purpose action.

5. The facility output system according to claim 1, further comprising:
a microphone for receiving an input of voice information by the user;
wherein the processor is programmed to specify the purpose on the basis of the received voice information.

6. A facility output method comprising:
receiving first information input by a user specifying a purpose for which the user intends to utilize the facility to be output;
specifying a first facility type that enables the specified purpose to be achieved based on purpose information stored in a memory and constituted by associating one or more facility types with each of a plurality of purposes that are achievable at the facility type;
specifying a second facility type, that is different form the first facility type based on second information input by the user;
performing location integration by:
determining whether the specified purpose can be achieved at the specified second facility type based on the stored purpose information;
if the specified purpose can be achieved at the second facility type, designating the second facility type as a common facility type; and
specifying a facility corresponding to the specified common facility type on the basis of facility information stored in the memory and constituted by associating each facility type with a plurality of corresponding facilities; and
outputting the specified facility as a target for vehicle navigation.

7. A computer-readable storage medium storing a computer-executable facility output program that causes a computer to execute the following functions:
receiving first information input by a user specifying a purpose for which the user intends to utilize the facility to be output;
specifying a first facility type that enables the specified purpose to be achieved based on purpose information stored in a memory and constituted by associating one or more facility types with each of a plurality of purposes that are achievable at the facility type;
specifying a second facility type, that is different form the first facility type based on second information input by the user;
performing location integration by:
determining whether the specified purpose can be achieved at the specified second facility type based on the stored purpose information;
if the specified purpose can be achieved at the second facility type, designating the second facility type as a common facility type; and
specifying a facility corresponding to the specified common facility type on the basis of facility information stored in the memory and constituted by associating each facility type with a plurality of corresponding facilities; and
outputting the specified facility as a target for vehicle navigation.

8. The facility output system according to claim 2, wherein the processor is programmed to:
determine a first navigation route starting at a departure location and including a facility corresponding to the first facility type and a facility corresponding to the second facility type based on the facility information;
determine a second navigation route starting at the departure location and including a facility corresponding to the specified common facility type;
calculate a time required for the first navigation route and a time required for the second navigation route; and
specify the common facility type and specify the facility such that the time required for the second route is shorter than the time required for the first route.

9. The facility output system according to claim 2, wherein:
the memory stores, as the purpose, a purpose object and a purpose action in association with each other; and
the processor is programmed to:
specify the purpose object and the purpose action from the first information input by the user; and
specify the first facility type that enables the specified purpose to be achieved, by specifying the first facility type corresponding to the specified purpose object and the specified purpose action.

10. The facility output system according to claim 3, wherein:
the memory stores, as the purpose, a purpose object and a purpose action in association with each other; and
the processor is programmed to:
specify the purpose object and the purpose action from the first information input by the user; and
specify the first facility type that enables the specified purpose to be achieved, by specifying the first facility type corresponding to the specified purpose object and the specified purpose action.

11. The facility output system according to claim 8, wherein:
the memory stores, as the purpose, a purpose object and a purpose action in association with each other; and
the processor is programmed to:
specify the purpose object and the purpose action from the first information input by the user; and
specify the first facility type that enables the specified purpose to be achieved, by specifying the first facility type corresponding to the specified purpose object and the specified purpose action.

12. The facility output system according to claim 2, further comprising:
a microphone for receiving an input of voice information by the user;
wherein the processor is programmed to specify the purpose on the basis of the received voice information.

13. The facility output system according to claim 3, further comprising:
a microphone for receiving an input of voice information by the user;
wherein the processor is programmed to specify the purpose on the basis of the received voice information.

14. The facility output system according to claim 4, further comprising:
a microphone for receiving an input of voice information by the user;
wherein the processor is programmed to specify the purpose on the basis of the received voice information.

15. The facility output system according to claim 8, further comprising:
a microphone for receiving an input of voice information by the user;
wherein the processor is programmed to specify the purpose on the basis of the received voice information.

16. The facility output system according to claim 9, further comprising:
   a microphone for receiving an input of voice information by the user;
   wherein the processor is programmed to specify the purpose on the basis of the received voice information.

17. The facility output system according to claim 10, further comprising:
   a microphone for receiving an input of voice information by the user;
   wherein the processor is programmed to specify the purpose on the basis of the received voice information.

18. The facility output system according to claim 11, further comprising:
   a microphone for receiving an input of voice information by the user;
   wherein the processor is programmed to specify the purpose on the basis of the received voice information.

* * * * *